United States Patent
Chen et al.

(10) Patent No.: US 12,098,234 B2
(45) Date of Patent: Sep. 24, 2024

(54) STABILITY OF POLYURETHANE POLYOL BLENDS CONTAINING HALOGENATED OLEFIN BLOWING AGENTS

(71) Applicant: Arkema Inc., King of Prussia, PA (US)

(72) Inventors: Benjamin Bin Chen, Wayne, PA (US); Joseph S. Costa, Gilbertsville, PA (US); Laurent T. Abbas, Ardmore, PA (US); Haiming Liu, Upper Umchlan, PA (US); Sri R. Seshadri, Holland, PA (US); William D. Honnick, Exton, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 17/215,066

(22) Filed: Mar. 29, 2021

(65) Prior Publication Data

US 2021/0261716 A1    Aug. 26, 2021

Related U.S. Application Data

(63) Continuation of application No. 16/397,028, filed on Apr. 29, 2019, now Pat. No. 10,961,339, which is a continuation of application No. 14/004,488, filed as application No. PCT/US2012/027800 on Mar. 6, 2012, now abandoned.

(60) Provisional application No. 61/451,673, filed on Mar. 11, 2011.

(51) Int. Cl.
| | |
|---|---|
| C08G 18/06 | (2006.01) |
| C08G 18/18 | (2006.01) |
| C08G 18/40 | (2006.01) |
| C08G 18/48 | (2006.01) |
| C08G 18/50 | (2006.01) |
| C08G 18/76 | (2006.01) |

(52) U.S. Cl.
CPC ......... *C08G 18/06* (2013.01); *C08G 18/1808* (2013.01); *C08G 18/1816* (2013.01); *C08G 18/1825* (2013.01); *C08G 18/1833* (2013.01); *C08G 18/4018* (2013.01); *C08G 18/482* (2013.01); *C08G 18/5033* (2013.01); *C08G 18/7664* (2013.01); C08G 2110/005 (2021.01)

(58) Field of Classification Search
CPC .............. C08G 18/06; C08G 18/7664; C08G 18/5033; C08G 18/482; C08G 18/4018; C08G 18/1833; C08G 18/1825; C08G 18/1816; C08G 18/1808; C08G 2110/005
See application file for complete search history.

(56) References Cited

U.S. PATENT DOCUMENTS

| | | | |
|---|---|---|---|
| 4,380,591 A | 4/1983 | Baskent et al. | |
| 4,563,484 A | 1/1986 | Jachimowicz | |
| 4,632,943 A | 12/1986 | Nichols | |
| 4,963,399 A | 10/1990 | Gill | |
| 5,169,996 A | 12/1992 | Crooker et al. | |
| 5,623,150 A | 4/1997 | Barthelemy et al. | |
| 6,089,512 A | 7/2000 | Ansorge | |
| 6,753,357 B2 * | 6/2004 | Kalinowski | C08G 18/4018 521/173 |
| 8,187,345 B2 | 5/2012 | Eisenbeis et al. | |
| 8,314,159 B2 | 11/2012 | Chen et al. | |
| 9,556,335 B2 | 1/2017 | Chen | C08G 18/4018 |
| 10,308,783 B2 | 6/2019 | Chen | C08G 18/6674 |
| 10,961,339 B2 * | 3/2021 | Chen | C08G 18/4018 |
| 2007/0043132 A1 | 2/2007 | Kiso et al. | |
| 2007/0287761 A1 | 12/2007 | Bender et al. | |
| 2009/0099272 A1 | 4/2009 | Williams | C08G 18/089 521/85 |
| 2009/0099274 A1 | 4/2009 | Van Der Puy et al. | |
| 2009/0124719 A1 | 5/2009 | Creazzo et al. | |
| 2009/0297779 A1 * | 12/2009 | Bottazzi | C08J 9/08 428/220 |
| 2010/0016457 A1 * | 1/2010 | Bowman | C08J 9/146 521/82 |
| 2010/0249259 A1 | 9/2010 | Kaneko et al. | |
| 2011/0152392 A1 | 6/2011 | Van Der Puy | C08G 18/1875 521/87 |
| 2012/0172476 A1 | 7/2012 | Costa | C08G 18/4018 521/170 |
| 2013/0041048 A1 | 2/2013 | Chen | C08G 18/4018 516/12 |

FOREIGN PATENT DOCUMENTS

| | | | |
|---|---|---|---|
| CA | 1 203 350 | 4/1986 | |
| JP | 5179043 | 7/1993 | |
| JP | 5179043 A | 7/1993 | |
| JP | 2009-13247 | 1/2009 | |
| WO | WO 2007/053670 A2 | 5/2007 | |
| WO | WO-2009114397 A2 * | 9/2009 | .......... B01F 17/0085 |

* cited by examiner

*Primary Examiner* — Rabon A Sergent
(74) *Attorney, Agent, or Firm* — David Weisberg

(57) ABSTRACT

A stable polyol pre-mix composition comprises a blowing agent, a polyol, a surfactant, and a catalyst composition comprising an oxygen-containing amine catalyst and a metallic salt. The oxygen-containing amine catalyst may be, for example, one or more of an alkanol amine, an ether amine, or a morpholine group-containing compound such as, for example, 2-(2-dimethylaminoethoxy)ethanol or N,N,N'-trimethylaminoethyl-ethanolamine. The metallic salt may be, for example, alkali earth carboxylates, alkali carboxylates, and carboxylates of metals selected form the group consisting of zinc (Zn), cobalt (Co), tin (Sn), cerium (Ce), lanthanum (La), aluminum (Al), vanadium (V), manganese (Mn), copper (Cu), nickel (Ni), iron (Fe), titanium (Ti), zirconium (Zr), chromium (Cr), scandium (Sc), calcium (Ca), magnesium (Mg), strontium (Sr), and barium (Ba).

8 Claims, 1 Drawing Sheet

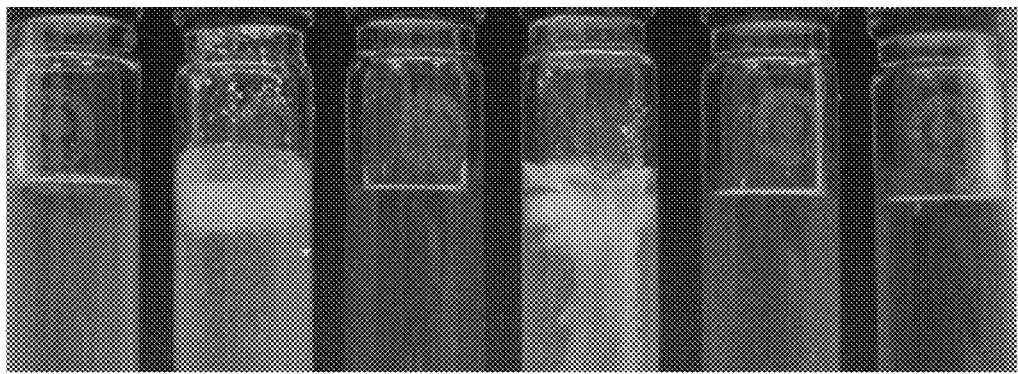
1   #2   #3   #4   #5   #6

STABILITY OF POLYURETHANE POLYOL BLENDS CONTAINING HALOGENATED OLEFIN BLOWING AGENTS

The present application is a continuation of and claims priority to U.S. Ser. No. 16/397,028 filed Apr. 29, 2019 which is a continuation of and claims priority to U.S. Ser. No. 14/004,488 filed Sep. 11, 2013, which claims priority to International Application serial number PCT/US12/27800 filed Mar. 6, 2012, which claims priority to U.S. provisional application Ser. No. 61/451,673 filed Mar. 11, 2011.

FIELD OF THE INVENTION

The present invention relates to a method for stabilizing thermosetting foam blends that include halogenated olefinic blowing agent, such as hydrochlorofluoroolefin (HCFO) HCFO-1233zd. More particularly, the present invention relates to a method for stabilizing thermosetting foam blends using a catalyst composition which includes an oxygen-containing amine catalyst. The present invention further relates to the stable pre-blend formulations and resulting polyurethane or polyisocyanurate foams.

BACKGROUND OF THE RELATED ART

The Montreal Protocol for the protection of the ozone layer mandated the phase-out of the use of chlorofluorocarbons (CFCs). Materials more "friendly" to the ozone layer, such as hydrofluorocarbons (HFCs), e.g., HFC-134a, replaced chlorofluorocarbons. The latter compounds have proven to be green house gases, causing global warming, and were regulated by the Kyoto Protocol on Climate Change. The emerging replacement materials, hydrofluoropropenes, were shown to be environmentally acceptable, i.e., they have zero ozone depletion potential (ODP) and acceptable low global warming potential (GWP).

Currently used blowing agents for thermoset foams include HFC-134a, HFC-245fa, HFC-365mfc, which have relatively high global warming potential, and hydrocarbons such as pentane isomers, which are flammable and have low energy efficiency. Therefore, new alternative blowing agents are being sought. Halogenated hydroolefinic materials such as hydrofluoropropenes and/or hydrochlorofluoropropenes have generated interest as replacements for HFCs. The inherent chemical instability of these materials in the lower atmosphere provides for a low global warming potential and zero or near zero ozone depletion properties desired.

It is convenient in many applications to provide the components for polyurethane or polyisocyanurate foams in pre-blended formulations. Most typically, the foam formulation is pre-blended into two components. The polyisocyanate and optional isocyanate compatible raw materials comprise the first component, commonly referred to as the "A–" side component. A polyol or mixture of polyols, surfactant, catalyst, blowing agent, and other isocyanate reactive and non-reactive components comprise the second component, commonly referred to as the "B–" side component. Accordingly, polyurethane or polyisocyanurate foams are readily prepared by bringing together the A– and B– side components either by hand mix for small preparations and, preferably, machine mix techniques to form blocks, slabs, laminates, pour-in-place panels and other items, spray applied foams, froths, and the like.

Two-component systems, however, have been found to have reduced shelf-life of the B-side composition, especially those systems which use certain hydrohaloolefins such as HFO-1234ze and HCFO-1233zd. Normally when a foam is produced by bringing together the A and B side components, a good foam is obtained.

However, if the polyol pre-mix composition is aged prior to treatment with the polyisocyanate, the foams are of lower quality and may even collapse during the formation of the foam. The poor foam structure is attributed to the reaction of certain catalysts with certain hydrohaloolefins, including HFO-1234ze and HCFO-1233zd, which results in the partial decomposition of the blowing agent and, subsequently, the undesirable modification of the polymeric silicone surfactants.

One way to overcome this problem, for example, is by separating the blowing agent, surfactant, and catalyst, and introducing them using a separate stream from the "A–" or "B–" side components. However, a preferred solution would not require such reformulation or process change. A more favorable method may be to utilize a catalyst that has a lower reactivity towards certain blowing agents. The commonly used catalysts for polyurethane chemistry can be classified into two broad categories: amine compounds and organometallic complexes. Amine catalysts are generally selected based on whether they drive: the gel catalysis (or polymerization) reaction, in which polyfunctional isocyanates react with polyols to form polyurethane, or the blow catalysis (or gas-producing) reaction, in which the isocyanate reacts with water to form polyurea and carbon dioxide. Amine catalysts can also drive the isocyanate trimerization reaction. Since some amine catalysts will drive all three reactions to some extent, they are often selected based on how much they favor one reaction over another.

For example, U.S. Patent Application No. 2009/0099274 utilizes sterically hindered amines that have low reactivity with hydrohaloolefins. However, sterically hindered amines are known to be gelling catalysts. Gelling catalysts are typically tertiary amines characterized in that they have higher selectivity for catalyzing the gelling or urethane reaction to the blowing or urea reaction. These catalysts are expected to perform poorly in systems containing high concentrations of water because of their inability to activate water towards isocyanate. Accordingly, these sterically hindered amines have good functionality as gelling catalysts, but perform poorly when employed as blow catalysts. Thus, in order to maintain the reactivity necessary in the blow catalysis reaction, the amount of sterically hindered catalyst used has to be increased. Additionally, since typically used amine catalysts are not chemically bonded to the polymer, the catalysts will eventually leave the polymer as volatile organic compounds (VOCs) which may cause adverse health effects.

Accordingly, the increased use of sterically hindered amines is not environmentally desirable. Thus, a method for stabilizing thermosetting foam blends, the resulting stable pre-mix blend formulations, and the environmentally-friendly polyurethane or polyisocyanurate foams having good foam structure remain highly desirable.

BRIEF SUMMARY OF THE INVENTION

It has now been discovered that oxygen-containing amine catalysts have less reactivity with hydrohaloolefins than traditional catalysts and have better catalytic performance than sterically hindered amine catalysts. Specifically, it has now been discovered that catalyst compositions containing oxygen-containing amine catalysts may be favorably used to stabilize thermosetting foam blends, including blends having halogenated olefinic blowing agents and a polyol premix B-side. The stabilization method was found to have prolonged the shelf life of the pre-mix and enhanced the foam characteristics of the resultant foam.

Accordingly, the oxygen-containing amine catalysts are a favorable replacement for traditional catalysts and for sterically hindered amine catalysts, such as dimethylcyclohexylamine (DMCHA) and pentamethyldiethyltriamine (PMDETA), as a component of a polyol pre-mix blend, in the process for stabilizing thermosetting foam blends, and in the resultant polyurethane or polyisocyanurate foams. The method of the present invention was found to surprisingly stabilize the pre-mix blends, while the blend compositions of the present invention were surprisingly found to possess long shelf life. The resultant foams of the present invention were found to have enhanced foam characteristics and may be employed to meet the demands of low or zero ozone depletion potential, lower global warming potential, low VOC content, and low toxicity, thereby making them environmentally-friendly.

In one embodiment, the present invention provides a polyol pre-mix composition which comprises a blowing agent, a polyol, a surfactant, and a catalyst composition comprising an oxygen-containing amine catalyst. In another embodiment, the present invention provides a polyol pre-mix composition which comprises a blowing agent, a polyol, a surfactant, and a catalyst composition comprising an oxygen-containing amine catalyst, wherein when the catalyst composition comprises more than one amine catalyst, the oxygen-containing amine catalyst comprises greater than 50 wt % of a total of the amine catalysts. That is to say, one or more oxygen-containing amine catalysts comprise, in total, greater than 50 wt % of the amine catalysts in the catalyst composition. In a further embodiment, the present invention provides a polyol pre-mix composition which comprises a blowing agent, a polyol, a surfactant, and a catalyst composition comprising an oxygen-containing amine catalyst, wherein when the catalyst composition comprises more than one amine catalyst, the oxygen-containing amine catalyst comprises less than 50 wt % of a total of the amine catalysts. That is to say, one or more oxygen-containing amine catalysts comprise, in total, less than 50 wt % of the amine catalysts in the catalyst composition.

The blowing agent may comprise a halogenated hydroolefin and, optionally, hydrocarbons, alcohols, aldehydes, ketones, ethers/diethers, or $CO_2$ generating materials, or combinations thereof. The surfactant may be a silicone or non-silicone surfactant. In some embodiments, the present invention may further include metallic salts, such as, for example, alkali earth carboxylates, alkali carboxylates, and carboxylates of zinc (Zn), cobalt (Co), tin (Sn), cerium (Ce), lanthanum (La), aluminum (Al), vanadium (V), manganese (Mn), copper (Cu), nickel (Ni), iron (Fe), titanium (Ti), zirconium (Zr), chromium (Cr), scandium (Sc), calcium (Ca), magnesium (Mg), strontium (Sr), and barium (Ba). These carboxylates can be readily formulated into a typical polyol pre-mix.

In another embodiment the present invention provides a stabilized thermosetting foam blend which comprises: (a) a polyisocyanate and, optionally, isocyanate compatible raw materials; and (b) a polyol pre-mix composition which comprises a blowing agent, a polyol, a surfactant, and a catalyst composition comprising an oxygen-containing amine catalyst. In at least one embodiment when the catalyst composition of the stabilized thermosetting foam blend comprises more than one amine catalyst, the oxygen-containing amine catalyst comprises greater than 50 wt % of a total of the amine catalysts. In a further embodiment when the catalyst composition of the stabilized thermosetting foam blend comprises more than one amine catalyst, the oxygen-containing amine catalyst comprises less than 50 wt % of a total of the amine catalysts.

In a further embodiment, the present invention is a method for stabilizing thermosetting foam blends which comprises combining: (a) a polyisocyanate and, optionally, isocyanate compatible raw materials; and (b) a polyol pre-mix composition which comprises a blowing agent, a polyol, a surfactant, and a catalyst composition comprising an oxygen-containing amine catalyst. In at least one embodiment when the catalyst composition of the polyol pre-mix comprises more than one amine catalyst, the oxygen-containing amine catalyst comprises greater than 50 wt % of a total of the amine catalysts. In a further embodiment when the catalyst composition of the polyol pre-mix comprises more than one amine catalyst, the oxygen-containing amine catalyst comprises less than 50 wt % of a total of the amine catalysts.

In yet another embodiment, the present invention provides a stable foamable thermosetting composition comprising a mixture of: (a) a polyisocyanate and, optionally, isocyanate compatible raw materials; and (b) a polyol pre-mix composition which comprises a blowing agent, a polyol, a surfactant, and a catalyst composition comprising an oxygen-containing amine catalyst. In at least one embodiment when the catalyst composition of the polyol pre-mix comprises more than one amine catalyst, the oxygen-containing amine catalyst comprises greater than 50 wt % of a total of the amine catalysts. In a further embodiment when the catalyst composition of the polyol pre-mix comprises more than one amine catalyst, the oxygen-containing amine catalyst comprises less than 50 wt % of a total of the amine catalysts. Accordingly, polyurethane or polyisocyanurate foams are readily prepared by bringing together the A– and B-side components either by hand mix for small preparations and, preferably, machine mix techniques to form blocks, slabs, laminates, pour-in-place panels and other items, spray applied foams, froths, and the like.

It has unexpectedly been discovered that oxygen-containing amine catalysts have less reactivity with hydrohaloolefins than traditional catalysts. The oxygen-containing amine catalysts were also surprisingly found to have better catalytic performance than other catalysts, including sterically hindered amine catalysts. The use of oxygen-containing amine catalysts in a polyol pre-mix blend composition surprisingly produced a thermoset blend composition that has prolonged shelf-life stability. The inventors of the present invention have further found that metallic salts, such as, for example, alkali earth carboxylates, alkali carboxylates, and carboxylates of zinc (Zn), cobalt (Co), tin (Sn), cerium (Ce), lanthanum (La), aluminum (Al), vanadium (V), manganese (Mn), copper (Cu), nickel (Ni), iron (Fe), titanium (Ti), zirconium (Zr), chromium (Cr), scandium (Sc), calcium (Ca), magnesium (Mg), strontium (Sr), and barium (Ba) have good hydrofluoric acid (HF) scavenger activity and add to the stabilization effect of the oxygen-containing amine catalysts. For example, metallic salts having one or more functional carboxyl groups may be employed as a HF scavenger. Such metallic salts may include, for example, magnesium formate, magnesium benzoate, magnesium octoate, calcium formate, calcium octoate, zinc octoate, cobalt octoate, stannous octoate, and dibutyltindilaurate (DBTDL). Optionally, a solvent may be utilized to dissolve the metallic salts for mixing with the polyol blend composition. Additionally, it is surprising and unexpected that the foams produced by mixing a polyol pre-mix blend composition with a polyisocyanate have a uniform cell structure with little or no foam collapse.

BRIEF DESCRIPTION OF THE FIGURES

FIG. 1 shows a picture of the binary blend samples prepared and analyzed in accordance with Example 1 of the present invention.

DETAILED DESCRIPTION OF CERTAIN EMBODIMENTS OF THE INVENTION

Polyurethane foaming was studied by using halogenated olefins such as hydrochlorofluoroolefin 1-chloro-3,3,3-trifluoropropene, commonly referred to as HCFO-1233zd. The blends for polyurethane foam include a polyol, a surfactant, an amine catalyst, a halogenated olefin, and a carbon dioxide ($CO_2$) generating material. It is now surprisingly found that the oxygen-containing amine catalyst used in the present invention results in the improved stability of the foam blends over time. Additionally, the resultant foams were surprisingly found to have a uniform cell structure with little or no foam collapse. Furthermore, the foam blends showed unexpected stability when a metallic salt, such as an alkali earth salt, was used.

Without being held to the theory, it is believed that the problem of the diminished shelf-life stability of the two-component systems, especially those using HCFO-1233zd, is related to the reaction of the halogenated olefins with the amine catalyst. The reaction produces hydrofluoric acid (HF) which attacks the silicone surfactant in situ. This side reaction was confirmed by hydrogen, fluorine, and silicon nuclear magnetic resonance (NMR) spectra and gas chromatography-mass spectrometry (GC-MS). This effect can be summarized as the Nucleophilic attack of the amine catalyst on the $C_1$ of the HCFO-1233zd halogenated olefin. Accordingly, the embodiments of the present invention reduce such detrimental interaction by decreasing the reactivity of the HCFO-1233zd halogenated olefin with the amine catalyst. The reduction in degradation of the olefin caused by the amine catalyst is thought to be tied to the synergistic effect of the nitrogen and oxygen constituents of the specific amine catalysts of the present invention. This synergistic effect prevents the detrimental interaction of the oxygen-containing amine catalyst with halogenated olefins such as HCFO-1233zd.

Known methods of overcoming this effect have focused on the use of various stabilizers to serve as scavengers for hydrofluoric acid. These stabilizers include alkenes, nitroalkanes, phenols, organic epoxides, amines, bromoalkanes, bromoalcohols, and alpha-methylstyrene, among others. More recently, methods have focused on the use of sterically hindered amines and organic acids, but these sacrifice catalytic activity. The inventors of the present invention have now identified the favorable use of oxygen-containing amine catalysts, such as 2-(2-dimethylaminoethoxy)ethanol and N,N,N'-trimethylaminoethyl-ethanolamine, which were found to have much less reactivity with the halogenated olefins, such as HCFO-1233zd (E and/or Z) and HFO 1234ze (E and/or Z), than traditional catalysts and better catalytic activity than sterically hindered amine catalysts. The inventors of the present invention have further found that metallic salts, such as, for example, alkali earth carboxylates, alkali carboxylates, and carboxylates of zinc (Zn), cobalt (Co), tin (Sn), cerium (Ce), lanthanum (La), aluminum (Al), vanadium (V), manganese (Mn), copper (Cu), nickel (Ni), iron (Fe), titanium (Ti), zirconium (Zr), chromium (Cr), scandium (Sc), calcium (Ca), magnesium (Mg), strontium (Sr), and barium (Ba) have good hydrofluoric acid (HF) scavenger activity and add to the stabilization effect of the oxygen-containing amine catalysts. For example, metallic salts having one or more functional carboxyl groups may be employed as HF scavengers. Such metallic salts may include, for example, magnesium formate, magnesium benzoate, magnesium octoate, calcium formate, calcium octoate, zinc octoate, cobalt octoate, stannous octoate, and dibutyltindilaurate (DBTDL).

The present invention thus provides a polyol pre-mix composition which comprises a blowing agent, a polyol, a surfactant, and a catalyst composition comprising an oxygen-containing amine catalyst. In another embodiment, the present invention provides a polyol pre-mix composition which comprises a blowing agent, a polyol, a surfactant, and a catalyst composition comprising an oxygen-containing amine catalyst, wherein when the catalyst composition comprises more than one amine catalyst, the oxygen-containing amine catalyst comprises greater than 50 wt % of a total of the amine catalysts. That is to say, one or more oxygen-containing amine catalysts comprise, in total, greater than 50 wt % of the amine catalysts in the catalyst composition. In a further embodiment, the present invention provides a polyol pre-mix composition which comprises a blowing agent, a polyol, a surfactant, and a catalyst composition comprising an oxygen-containing amine catalyst, wherein when the catalyst composition comprises more than one amine catalyst, the oxygen-containing amine catalyst comprises less than 50 wt % of a total of the amine catalysts. That is to say, one or more oxygen-containing amine catalysts comprise, in total, less than 50 wt % of the amine catalysts in the catalyst composition. In another embodiment the present invention provides a stabilized thermosetting foam blend which comprises: (a) a polyisocyanate and, optionally, isocyanate compatible raw materials; and (b) a polyol pre-mix composition. In yet another embodiment, the present invention is a method for stabilizing thermosetting foam blends which comprises combining: (a) a polyisocyanate and, optionally, isocyanate compatible raw materials; and (b) a polyol pre-mix composition. The mixture according to this method produces a stable foamable thermosetting composition which can be used to form polyurethane or polyisocyanurate foams.

Commonly used catalysts for polyurethane chemistry can generally be classified into two broad categories: amine compounds and organometallic complexes. Traditional amine catalysts have been tertiary amines, such as triethylenediamine (TEDA), dimethylcyclohexylamine (DMCHA), and dimethylethanolamine (DMEA). Amine catalysts are generally selected based on whether they drive the gelling reaction or the blowing reaction. In the gelling reaction, polyfunctional isocyanates react with polyols to form polyurethane. In the blowing reaction, the isocyanate reacts with water to form polyurea and carbon dioxide. Amine catalysts can also drive the isocyanate trimerization reaction. These reactions take place at different rates; both reaction rates are dependent on temperature, catalyst level, catalyst type and a variety of other factors. However, to produce high-quality foam, the rates of the competing gelling and blowing reactions must be properly balanced.

Some known amine catalysts, such as sterically hindered amine catalysts, have been found to have good gelling reaction functionality, but perform poorly as blow reaction catalysts. For example, tetramethylbutanediamine (TMBDA) preferentially drives the gel reaction over the blow reaction. On the other hand, both pentamethyldipropylenetriamine and N-(3-dimethylaminopropyl)-N,N-diisopropanolamine balance the blow and gel reactions, although the former is more potent than the later on a weight basis. Molecular structure gives some clue to the strength and selectivity of the catalyst. Blow catalysts generally have an ether linkage two carbons away from a tertiary nitrogen. Examples include bis-(2-dimethylaminoethyl)ether and N-ethylmorpholine. Strong gel catalysts may contain alkyl-substituted nitrogens, such as triethylamine (TEA), 1,8-diazabicyclo[5.4.0]undecene-7 (DBU). Weaker gel catalysts may contain ring-substituted nitrogens, such as benzyldimethylamine (BDMA). Trimerization catalysts may contain the triazine structure, or are quaternary ammonium salts. Catalysts that contain a hydroxyl group or an active amino hydrogen, such as N,N,N'-trimethyl-N'-hydroxyethyl-bis (aminoethyl)ether and N'-(3-(dimethylamino)propyl)-N,N-dimethyl-1,3-propanediamine that react into the polymer matrix can replace traditional catalysts in some applications for aesthetic or environmental purposes.

The oxygen-containing amine catalysts of the present invention include those amines containing ether and/or a hydroxyl group. For example, the oxygen-containing amine catalyst may be an alkanolamine, ether amine or a morpholine group-containing catalyst such as an N-alkyl substituted morpholine. The catalyst may contain one, two, three or more nitrogen atoms in the form of amine functional groups. In one embodiment, all of the amine groups present in the catalyst molecule are tertiary amine groups. The catalyst, in one embodiment, may contain two, three or more oxygen atoms; these oxygen atoms may be present in the form of ether groups, hydroxyl groups or both ether and hydroxyl groups. Suitable oxygen-containing amine catalysts include compounds corresponding to the following chemical structure:

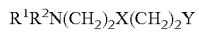

wherein $R^1$ and $R^2$ are the same or different and are each a $C_1$-$C_6$ alkyl group, such as methyl, and/or an alkanol group, such as —$CH_2CH_2OH$ or $CH_2CH(CH_3)OH$; X is O or $NR^3$ and/or it can be terminated by OH, where $R^3$ is a $C_1$-$C_6$ alkyl group, such as methyl, or an alkanol group, such as —$CH_2CH_2OH$ or $CH_2CH(CH_3)OH$; and Y is OH or $NR^4R^5$, where $R^4$ and $R^5$ are the same or different and are each a $C_1$-$C_6$ alkyl group, such as methyl, and/or an alkanol group such as —$CH_2CH_2OH$ or —$CH_2CH(CH_3)OH$; subject to the proviso that the compound contains at least one ether and/or hydroxyl group.

Exemplary Oxygen-Containing Amine Catalysts Include bis-(2-dimethylaminoethyl)ether;
N,N-dimethylethanolamine;
N-ethylmorpholine;
N-methylmorpholine;
N,N,N'-trimethyl-N'-hydroxyethyl-bisaminoethylether;
N-(3-dimethylaminopropyl)-N,N-diisopropanolamine;
N,N-bis(3-dimethylaminopropyl)-N-isopropanolamine;
2-(2-dimethylaminoethoxy)ethanol;
N,N,N'-trimethylaminoethyl-ethanolamine; and
2,2'-dimorpholinodiethylether, and mixtures thereof.

As described above, catalysts function to control and balance the gelling and blowing reactions. Tertiary amine catalysts have their own specific catalytic characteristics such as gelling, blowing, and crosslinking activity. As would be appreciated by one having ordinary skill in the art, these catalytic activities have a strong relationship with rise profile, blowing efficiency, moldability, productivity, and other properties of the resulting foam. Accordingly, the oxygen-containing amine catalysts of the present invention can be further used with other amine or non-amine catalysts to balance the blow, gel, and trimerization catalysis reactions and produce a foam having the desired properties. The catalyst composition of the present invention may consist entirely of oxygen-containing amine catalysts. Alternatively, the catalyst composition of the present invention may additionally include more than one type of amine or non-amine catalysts.

The operable range of the quantity of the oxygen-containing amine catalyst of the present invention can be measured as a comparison with the other amine catalyst of the composition, when other amine catalysts are employed. For example, when the oxygen-containing amine catalyst is combined with another amine catalyst, the catalyst composition of the present invention may comprise greater than 50 wt % of an oxygen-containing amine catalyst. In another example, when the oxygen-containing amine catalyst is combined with another amine catalyst, the catalyst composition of the present invention may comprise less than 50 wt % of an oxygen-containing amine catalyst. The catalyst compositions containing one or more oxygen-containing amine catalysts have improved catalytic performance and produce a thermoset blend composition that has prolonged shelf-life stability. While the other amine catalysts may aid in controlling the desired gelling and blowing reactions, the oxygen-containing amine catalysts impart the desired catalytic performance and prolong the shelf-life stability of the thermoset blend by decreasing the Nucleophilic attack of the amine catalyst on the $C_1$ of the HCFO-1233zd halogenated olefin. Accordingly, the catalyst compositions of the present invention reduce the detrimental interaction by decreasing the reactivity between the halogenated olefin and the amine catalyst.

Exemplary amine catalysts include: N-(3-dimethylaminopropyl)-N,N-diisopropanolamine, N,N-bis(3-dimethylaminopropyl)-N-isopropanolamine, 1,3-propanediamine, N'-(3-dimethylamino)propyl-N,N-dimethyl-, triethylenediamine, 1,2-dimethylimidazole, 1,3-propanediamine,N'-(3-(dimethylamino)propyl)-N,N-dimethyl-, N,N,N'N'-tetramethylhexanediamine, N,N',N''-trimethylaminoethylpiperazine, 1-methyl-4-(2-dimethylaminoethyl)piperazine, N,N,N',N'tetramethylethylenediamine, N,N-dimethylcyclohexylamine (DMCHA), Bis(N,N-dimethylaminoethyl)ether (BDMAFE), 1,4-diazabicyclo [2,2,2]octane (DABCO), 2-((2-dimethylaminoethoxy)-ethyl methyl-amino)ethanol, 1-(bis (3-dimethylamino)-propyl)amino-2-propanol, N,N',N'''-tris (3-dimethylamino-propyl)hexahydrotriazine, 1,3,5-tris(3-(dimethylamino)propyl-hexahydro-s-triazine, dimorpholinodiethylether (DMDEE), N.N-dimethylbenzylamine, N,N,N',N'',N''-pentaamethyldipropylenetriamine, N,N'-diethylpiperazine, dicyclohexylmethylamine, ethyldiisopropylamine, dimethylcyclohexylamine, dimethylisopropylamine, methylisopropylbenzylamine, methylcyclopentylbenzylamine, isopropyl-sec-butyl-trifluoroethylamine, diethyl-(α-phenyethyl)amine, tri-n-propylamine, dicyclohexylamine, t-butylisopropylamine, di-t-butylamine, cyclohexyl-t-butylamine, de-sec-butylamine, dicyclopentylamine, di-(α-trifluoromethylethyl)amine, di-(α-phenylethyl) amine, triphenylmethylamine, and 1,1-diethyl-n-propylamine. Other amines include morpholines, imidazoles, ether containing compounds such as dimorpholinodiethylether, N-ethylmorpholine, N-methylmorpholine, bis(dimethylaminoethyl)ether, imidizole, n-methylimidazole, 1,2-dimethylimidazole, dimorpholinodimethylether, N,N,N',N',N",N"-pentamethyldipropylenetriamine, and bis (diethylaminoethyl)ether, bis(dimethylaminopropyl)ether, dimethylpiperazine, diethylaminopropylamine, ethylaminoethanol, diethylaminoethanol, isopropylaminoethanol, butylaminoethanol, dibutylaminoethanol, butyldiethanolamine, tert-butylaminoethanol, diethylhydroxylamine, and combinations thereof.

Exemplary non-amine catalysts include organometallic compounds containing bismuth, lead, tin, antimony, cadmium, cobalt, iron, thorium, aluminum, mercury, zinc, nickel, cerium, molybdenum, titanium, vanadium, copper, manganese, zirconium, magnesium, calcium, sodium, potassium, lithium or combination thereof such as stannous octoate, dibutyltin dilaurate (DGTDL), dibutyltin mercaptide, phenylmercuric propionate, lead octoate, potassium acetate/octoate, magnesium acetate, titanyl oxalate, potassium titanyl oxalate, quaternary ammonium formates, and ferric acetylacetonate, and combinations thereof.

Bismuth and zinc carboxylates may be favorably employed over mercury and lead based catalysts, due to the toxicity and the necessity to dispose of mercury and lead catalysts and catalyzed material as hazardous waste in the United States, however these may have shortcomings in pot life and in certain weather conditions or applications. Alkyl tin carboxylates, oxides and mercaptides oxides are used in all types of polyurethane applications. Organometallic catalysts are useful in two-component polyurethane systems. These catalysts are designed to be highly selective toward the isocyanate-hydroxyl reaction as opposed to the isocyanate-water reaction.

As would be appreciated by one having ordinary skill in the art, the oxygen-containing amine catalysts of present invention may be selected, based on the various factors such as temperature, to produce balanced gelling and blowing reaction rates. Balancing the two competing reactions will produce high-quality foam structure. An ordinarily skilled artisan would further appreciate that the oxygen-containing amine catalysts of the present invention may be employed alone, or in combination with other amine catalysts or organometallic catalysts, to achieve the desired functional properties and characteristics of the resulting foam structure. This includes, but is not limited to, other catalysts that have gelling or blowing reaction functionality.

The blowing agent in the thermosetting foam blends in one embodiment of the present invention includes an unsaturated halogenated hydroolefin such as a hydrofluoroolefin (HFO), hydrochlorofluoroolefin (HCFO), hydrofluorocarbon (HFC), hydrofluoroether (HFE), or mixtures thereof, and optionally hydrocarbons, alcohols, aldehydes, ketones, ethers/diethers or carbon dioxide generating materials. The preferred blowing agent in the thermosetting foam blend of the present invention is a hydrofluoroolefin (HFO) or a hydrochlorofluoroolefin (HCFO), alone or in a combination. Preferred hydrofluoroolefin (HFO) blowing agents contain 3, 4, 5, or 6 carbons, and include but are not limited to pentafluoropropenes, such as 1,2,3,3,3-pentafluoropropene (HFO 1225ye); tetrafluoropropenes, such as 1,3,3,3-tetrafluoropropene (HFO 1234ze, E and Z isomers), 2,3,3,3-tetrafluoropropene (HFO 1234yf), and 1,2,3,3-tetrafluoropropene (HFO1234ye); trifluoropropenes, such as 3,3,3-trifluoropropene (1243zf); tetrafluorobutenes, such as (HFO 1345); pentafluorobutene isomers, such as (HFO1354); hexafluorobutene isomers, such as (HFO1336); heptafluorobutene isomers, such as (HFO1327); heptafluoropentene isomers, such as (HFO1447); octafluoropentene isomers, such as (HFO1438); nonafluoropentene isomers, such as (HFO1429); and hydrochlorofluoroolefins, such as 1-chloro-3,3,3-trifluoropropene (HCFO-1233zd) (E and Z isomers), 2-chloro-3,3,3-trifluoropropene (HCFO-1233xf), HCFO-1223, 1,2-dichloro-1,2-difluoroethene (E and Z isomers), 3,3-dichloro-3-fluoropropene, 2-chloro-1,1,1,4,4,4-hexafluorobutene-2 (E and Z isomers), and 2-chloro-1,1,1,3,4,4,4-heptafluorobutene-2 (E and Z isomers). Preferred blowing agents in the thermosetting foam blends of the present invention include unsaturated halogenated hydroolefins with normal boiling points less than about 60° C. Preferred hydrochlorofluoroolefin blowing agents include, but are not limited to, 1-chloro-3,3,3-trifluoropropene; E and/or Z 1233zd; 1,3,3,3-tetrafluopropene; and E and/or Z 1234ze.

The blowing agents in the thermosetting foam blend of the present invention can be used alone or in combination with other blowing agents, including but not limited to:

(a) hydrofluorocarbons including but not limited to difluoromethane (HFC32); 1,1,1,2,2-pentafluoroethane (HFC125); 1,1,1-trifluoroethane (HFC143a); 1,1,2,2-tetrafluorothane (HFC134); 1,1,1,2-tetrafluoroethane (HFC134a); 1,1-difluoroethane (HFC152a); 1,1,1,2,3,3,3-heptafluoropropane (HFC227ea); 1,1,1,3,3-pentafluoropropane (HFC245fa); 1,1,1,3,3-pentafluobutane (HFC365mfc) and 1,1,1,2,2,3,3,4,5,5,5-decafluoropentane (HFC4310mee), (b) hydrocarbons including but not limited to, pentane isomers and butane isomers;

(c) hydrofluoroethers (HFE) such as, $C_4F_9OCH_3$ (HFE-7100), $C_4F_9OC_2H_5$ (HFE-7200), $CF_3CF_2OCH_3$ (HFE-245cb2), $CF_3CH_2CHF_2$ (HFE-245fa), $CF_3CH_2OCF_3$ (HFE-236fa), $C_3F_7OCH_3$ (HFE-7000), 2-trifluoromethyl-3-ethoxydodecofluorohexane (HFE 7500), 1,1,1,2,3-hexafluoro-4-(1,1,2,3,3,3-hexafluoropropoxy)-pentane (HFE-7600), 1,1,1,2,2,3,5,5,5-decafluoro-3-methoxy-4-(trifluoromethyl)pentane (HFE-7300), ethyl nonafluoroisobutyl ether/ethyl nonafluorobutyl ether (HFE 8200), $CHF_2OCHF_2$, $CHF_2$—$OCH_2F$, $CH_2F$—$OCH_2F$, $CH_2FO$—$CH_3$, cyclo-$CF_2CH_2CF_2$—O, cyclo-$CF_2CF_2CH_2$—O, $CHF_2$—$CF_2CHF_2$, $CF_3CF_2$—$OCH_2F$, $CHF_2$—O—$CHFCF_3$, $CHF_2$—$OCF_2CHF_2$, $CH_2F$—O—$CF_2CHF_2$, $CF_3$—O—$CF_2CH_3$, $CHF_2CHF$—O—$CHF_2$, $CF_3$—O—$CHFCH_2F$, $CF_3CHFO$—$CH_2F$, $CF_3$—O—$CH_2CHF_2$, $CHF_2$—O—$CH_2CF_3$, $CH_2FCF_2$—O—$CH_2F$, $CHF_2$—O—$CF_2CH_3$, $CHF_2CF_2$—O—$CH_3$ (HFE254pc), $CH_2F$—O—$CHFCH_2F$, $CHF_2$—$CHFO$—$CH_2F$, $CF_3$—O—$CHFCH_3$, $CF_3CHFO$—$CH_3$, $CHF_2$—O—$CH_2CHF_2$, $CF_3$—O—$CH_2CH_2F$, $CF_3CH_2$—O—$CH_2F$, $CF_2HCF_2CF_2$—O—$CH_3$, $CF_3CHFCF_2$—O—$CH_3$, $CHF_2CF_2CF_2$—O—$CH_3$, $CHF_2CF_2CH_2$—$OCHF_2$, $CF_3CF_2CH_2$—O—$CH_3$, $CHF_2CF_2$—O—$CH_2CH_3$, $(CF_3)_2CFO$—$CH_3$, $(CF_3)_2CH$—O—$CHF_2$, and $(CF_3)_2CH$—O—$CH_3$, and mixtures thereof; and (d) C1 to C5 alcohols, C1 to C4 aldehydes, C1 to C4 ketones, C1 to C4 ethers and diethers and carbon dioxide generating materials.

The thermosetting foam blends of the present invention include one or more components capable of forming foam having a generally cellular structure and blowing agent(s). Examples of thermosetting compositions include polyurethane and polyisocyanurate foam compositions, preferably low-density foams, flexible or rigid.

The invention also relates to foam, and preferably closed cell foam, prepared from a thermosetting foam formulation to which has been added a stabilizing amount of an ester. When an ester is employed, the order and manner in which the blowing agent and ester combination of the present invention is formed and/or added to the foamable composition does not generally affect the operability of the present invention. For example, in the case of polyurethane foams, it is possible that the various components of the blowing agent and ester combination not be mixed in advance of introduction to the foaming equipment, or even that the components are not added to the same location in the foaming equipment. Thus, in certain embodiments it may be desired to introduce one or more components of the blowing agent and ester combination in such a way that the components will come together in the foaming equipment. Nevertheless, in certain embodiments, the components of the blowing agent and ester combination are combined in advance and introduced together into the foamable composition, either directly or as part of a pre-mix that is then further added to other parts of the foamable composition.

In certain embodiments in the preparation of polyurethane polyol foams, the B-side polyol pre-mix can include polyols, silicone or non-silicone based surfactants, amine catalysts, flame retardants or suppressors, acid scavengers, radical scavengers, fillers, and other stabilizers or inhibitors.

The polyol component, which can include mixtures of polyols, can be any polyol which reacts in a known fashion with an isocyanate in preparing a polyurethane or polyisocyanurate foam. Exemplary polyols include: glycerin-based polyether polyols such as Carpol® GP-700, GP-725, GP-4000, GP-4520; amine-based polyether polyols such as Carpol® TEAP-265 and EDAP-770, Jeffol® AD-310; sucrose-based polyether polyols, such as Jeffol® SD-360, SG-361, and SD-522, Voranol® 490, and Carpol® SPA–357; Mannich-based polyether polyols, such as Jeffol® R-425X and R-470X; sorbitol-based polyether polyols, such as Jeffol® S-490; and aromatic polyester polyols such as Terate® 2541 and 3510, Stepanpol® PS-2352, and Terol® TR-925.

The polyol pre-mix composition may also contain a surfactant. The surfactant is used to form a foam from the mixture, as well as to control the size of the bubbles of the foam so that a foam of a desired cell structure is obtained. Preferably, a foam with small bubbles or cells therein of uniform size is desired since it has the most desirable physical properties such as compressive strength and thermal conductivity. Also, it is critical to have a foam with stable cells which do not collapse prior to foaming or during foam rise. Silicone surfactants for use in the preparation of polyurethane or polyisocyanurate foams are available under a number of trade names known to those skilled in this art. Such materials have been found to be applicable over a wide range of formulations allowing uniform cell formation and maximum gas entrapment to achieve very low density foam structures.

Exemplary silicone surfactants include polysiloxane polyoxyalkylene block co-polymer such as B8404, B8407, B8409, B8462 and B8465 available from Goldschmidt; DC-193, DC-197, DC-5582, and DC-5598 available from Air Products; and L-5130, L5180, L-5340, L-5440, L-6100, L-6900, L-6980, and L6988 available from Momentive. Exemplary non-silicone surfactants include salts of sulfonic acid, alkali metal salts of fatty acids, ammonium salts of fatty acids, oleic acid, stearic acid, dodecylbenzenedisulfonic acid, dinaphthylmetanedisulfonic acid, ricinoleic acid, an oxyethylated alkylphenol, an oxyethylated fatty alcohol, a paraffin oil, a caster oil ester, a ricinoleic acid ester, Turkey red oil, groundnut oil, a paraffin fatty alcohol, or combinations thereof. Typical use levels of surfactants are from about 0.4 to 6 wt % of polyol pre-mix, preferably from about 0.8 to 4.5 wt %, and more preferably from about 1 to 3 wt %.

Exemplary flame retardants include trichloropropyl phosphate (TCPP), triethyl phosphate (TEP), diethyl ethyl phosphate (DEEP), diethyl bis (2-hydroxyethyl) amino methyl phosphonate, brominated anhydride based ester, dibromoneopentyl glycol, brominated polyether polyol, melamine, ammonium polyphosphate, aluminum trihydrate (ATH), tris (1,3-dichloroisopropyl) phosphate, tri(2-chloroethyl) phosphate, tri(2-chloroisopropyl) phosphate, chloroalkyl phosphate/oligomeric phosphonate, oligomeric chloroalkyl phosphate, brominated flame retardant based on pentabromo diphenyl ether, dimethyl methyl phosphonate, diethyl N,N bis(2-hydroxyethyl) amino methyl phosphonate, oligomeric phosphonate, and derivatives thereof.

In certain embodiments, acid scavengers, radical scavengers, and/or other stabilizers/inhibitors are included in the pre-mix. Exemplary stabilizer/inhibitors include 1,2-epoxy butane; glycidyl methyl ether; cyclic-terpenes such as dl-limonene, 1-limonene, d-limonene; 1,2-epoxy-2,2-methylpropane; nitromethane; diethylhydroxyl amine; alpha methylstyrene; isoprene; p-methoxyphenol; m-methoxyphenol; dl-limonene oxide; hydrazines; 2,6-di-t-butyl phenol; hydroquinone; organic acids such as carboxylic acid, dicarboxylic acid, phosphonic acid, sulfonic acid, sulfamic acid, hydroxamic acid, formic acid, acetic acid, propionic acid, butyric acid, caproic acid, isocaprotic acid, 2-ethylhexanoic acid, caprylic acid, cyanoacetic acid, pyruvic acid, benzoic acid, oxalic acid, malonic acid, succinic acid, adipic acid, azelaic acid, trifluoroacetic acid, methanesulfonic acid, benzenesulfonic acid, and combinations thereof. Other additives such as adhesion promoters, anti-static agents, antioxidants, fillers, hydrolysis agents, lubricants, anti-microbial agents, pigments, viscosity modifiers, UV resistance agents may also be included. Examples of these additives include: sterically hindered phenols; diphenylamines; benzofuranone derivatives; butylated hydroxytoluene (BHT); calcium carbonate; barium sulphate; glass fibers; carbon fibers; microspheres; silicas; melamine; carbon black; waxes and soaps; organometallic derivatives of antimony, copper, and arsenic; titanium dioxide; chromium oxide; iron oxide; glycol ethers; dimethyl AGS esters; propylene carbonate; and benzophenone and benzotriazole compounds.

In some embodiments of the present invention, an ester may be added to a thermosetting foam blend. The addition of an ester was surprisingly discovered to further improve the stability of the blend over time, as in extending shelf life of the pre-mix, and enhancing the properties of the resultant foam. Esters used in the present invention have the formula R—C(O)—O—R', where R and R' can be $C_aH_{c-b}G_b$, where G is a halogen such as F, Cl, Br, I, a=0 to 15, b=0 to 31, and c=1 to 31, and include esters that are the product of dicarboxylic acid, phosphinic acid, phosphonic acid, sulfonic acid, sulfamic acid, hydroxamic acid or combination thereof. Preferred esters are the products of an alcohol such as methanol, ethanol, ethylene glycol, diethylene glycol, propanol, isopropanol, butanol, iso-butanol, pentanol, isopentanol and mixtures thereof; and an acid such as formic, acetic, propionic, butyric, caproic, isocaprotic, 2-ethylhexanoic, caprylic, cyanoacetic, pyruvic, benzoic, oxalic, trifluoacetic, oxalic, malonic, succinic, adipic, zaelaic, trifluoroacetic, methanesulfonic, benzene sulfonic acid and mixture thereof. The more preferred esters are allyl hexanoate, benzyl acetate, benzyl formate, bornyl acetate, butyl butyrate, ethyl acetate, ethyl butyrate, ethyl hexanoate, ethyl cinnamate, ethyl formate, ethyl heptanoate, ethyl isovalerate, ethyl lactate, ethyl nonanoate, ethyl pentanoate, geranyl acetate, geranyl butyrate, geranyl pentanoate, isobutyl acetate, isobutyl formate, isoamyl acetate, isopropyl acetate, linalyl acetate, linalyl butyrate, linalyl formate, methyl acetate, methyl anthranilate, methyl benzoate, methyl butyrate, methyl cinnamate, methyl formate, methyl pentanoate, methyl propanoate, methyl phenylacetate, methyl salicylate, nonyl caprylate, octyl acetate, octyl butyrate, amyl acetate/pentyl acetate, pentyl butyrate/amyl butyrate, pentyl hexanoate/amyl caproate, pentyl pentanoate/amyl valerate, propyl ethanoate, propyl isobutyrate, terpenyl butyrate and mixtures thereof. Most preferred esters are methyl formate, ethyl formate, methyl acetate, and ethyl acetate, and mixtures thereof.

The ester can be added in combination with the blowing agent, or can be added separately from the blowing agent into the thermosetting foam blend by various means known in art. The typical amount of an ester is from about 0.1 wt % to 10 wt % of thermosetting foam blend, the preferred amount of an ester is from about 0.2 wt % to 7 wt % of thermosetting foam blend, and the more preferred amount of an ester is from about 0.3 wt % to 5 wt % of thermosetting foam blend.

The preparation of polyurethane or polyisocyanurate foams using the compositions described herein may follow any of the methods well known in the art can be employed, see Saunders and Frisch, Volumes I and II Polyurethanes Chemistry and technology, 1962, John Wiley and Sons, New York, N.Y. or Gum, Reese, Ulrich, Reaction Polymers, 1992, Oxford University Press, New York, N.Y. or Klempner and Sendijarevic, Polymeric Foams and Foam Technology, 2004, Hanser Gardner Publications, Cincinnati, Ohio. In general, polyurethane or polyisocyanurate foams are prepared by combining an isocyanate, the polyol pre-mix composition, and other materials such as optional flame retardants, colorants, or other additives. These foams can be rigid, flexible, or semi-rigid, and can have a closed cell structure, an open cell structure or a mixture of open and closed cells.

It is convenient in many applications to provide the components for polyurethane or polyisocyanurate foams in pre-blended formulations. Most typically, the foam formulation is pre-blended into two components. The isocyanate and optionally other isocyanate compatible raw materials comprise the first component, commonly referred to as the "A–" side component. The polyol mixture composition, including surfactant, catalysts, blowing agents, and optional other ingredients comprise the second component, commonly referred to as the "B–" side component. In any given application, the "B–" side component may not contain all the above listed components, for example some formulations omit the flame retardant if that characteristic is not a required foam property. Accordingly, polyurethane or polyisocyanurate foams are readily prepared by bringing together the A– and B-side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, water, and even other polyols can be added as a stream to the mix head or reaction site. Most conveniently, however, they are all incorporated into one B-side component as described above. In some circumstances, A and B can be formulated and mixed into one component in which water is removed. This is typical, for example, for a spray-foam canister containing a one-component foam mixture for easy application.

A foamable composition suitable for forming a polyurethane or polyisocyanurate foam may be formed by reacting an organic polyisocyanate and the polyol premix composition described above. Any organic polyisocyanate can be employed in polyurethane or polyisocyanurate foam synthesis inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry.

EXAMPLES

The invention is further illustrated by reference to the following Examples.

Example 1

A series of binary blends for a B-side composition of a two-component system were prepared and analyzed which combine a hydrohaloolefin with various amine catalysts. To ensure a true comparison, each of the blends included the same halogenated olefinic blowing agent, specifically the hydrochlorofluoroolefin (HCFO) HCFO-1233zd "E". The following binary blend compositions were prepared and analyzed:

Comparative Blend #1: 98 wt % pentamethyldiethylenetriamine (PMDETA) catalyst and 2 wt % HCFO-1233zd "E", aged at room temperature for 15 days;

Comparative Blend #2: 98 wt % pentamethyldiethylenetriamine (PMDETA) catalyst and 2 wt % HCFO-1233zd "E", aged at 50° C. for 15 days;

Exemplary Blend #3: 98 wt % N,N,N'-trimethyl-N'-hydroxyethyl-bisaminoethylether and 2 wt % HCFO-1233zd "E", aged at 50° C. for 15 days;

Exemplary Blend #4: 98 wt % bis-(2-dimethylaminoethyl)ether and 2 wt % HCFO-1233zd "E", aged at 50° C. for 15 days;

Exemplary Blend #5: 98 wt % 2-(2-dimethylaminoethoxy)ethanol and 2 wt % HCFO-1233zd "E", aged at 50° C. for 15 days; and Exemplary Blend #6: 98 wt % N,N,N'-trimethylaminoethyl-ethanolamine and 2 wt % HCFO-1233zd "E", aged at 50° C. for 15 days.

Each binary blend was mixed with a solution of deuterated chloroform ($CDCl_3$) solvent. The blends were then analyzed for NMR spectra at 25° C., acquired on a Bruker DRX 500 (11.7 T) spectrometer equipped with a 5 mm TBI probe. The results are summarized in Table 1 below.

TABLE 1

NMR spectra analysis of the comparative and exemplary blends.

| Binary Blend | Percentage of detrimental reaction product (%) |
|---|---|
| 1 | 20 |
| 2 | 100 |
| 3 | 37 |
| 4 | 55 |
| 5 | 7 |
| 6 | 5 |

Table 1 shows that exemplary binary blends #5 and 6 have the least amount of detrimental reaction product resulting from the interaction between the amine catalyst and the hydrochlorofluoroolefin (HCFO) HCFO-1233zd "E" halogenated olefinic blowing agent. This is consistent with the visual coloration and turbidity assessment of the binary blends shown in FIG. 1.

Example 1a

Example 1a shows the effect of ageing on the blends containing a hydrochlorofluoroolefin (HCFO) HCFO-1233zd "E" halogenated olefinic blowing agent, dimethylcyclohexylamine, and pentamethyldiethylenetriamine (PM-DETA). Dimethylcyclohexylamine sold under the trade name POLYCAT® 8 and pentamethyldiethylenetriamine sold under the trade name POLYCAT® 5 were used for this experiment, both of which are available from Air Products and Chemicals, Inc.

The binary blend of HCFO-1233zd "E" and dimethylcyclohexylamine was prepared in a glass tube with a weight percent ratio of 90:10. The sample was then placed in an oven at 80° C. for 16 days. The sample was taken out of the oven. The weight of the glass tubes was compared to their initial weight to verify that the tube had no leaks. Visual inspection showed that all samples suffered from turbidity and solids could be seen at the bottom of the tubes. As is known in the art, a smoked paper filter was used to collect and quantify the amount of the solids in each of the tubes. The experiments were repeated three times. The mean value of the three solids weights corresponding to 40 wt % of the initial weight of the dimethylcyclohexylamine. The same experiment was performed for the binary blend of HCFO-1233zd "E" and pentamethyldiethylenetriamine, with a mean value of the three solids weights corresponding to 55 wt % of the initial weight of pentamethyldiethylenetriamine. This example showed that both dimethylcyclohexylamine and pentamethyldiethylenetriamine had strong reactions with the hydrochlorofluoroolefin (HCFO) HCFO-1233zd "E" halogenated olefinic blowing agent, and that the pentamethyldiethylenetriamine had a stronger interaction than the dimethylcyclohexylamine.

Example 1b

Example 1b shows the effect of ageing of the polyol premix containing dimethylcyclohexylamine prior to the addition of pentamethyldiethylenetriamine and a silicone surfactant. Dimethylcyclohexylamine sold under the trade name POLYCAT® 8 and pentamethyldiethylenetriamine sold under the trade name POLYCAT® 5 were used for this example, both of which are available from Air Products and Chemicals, Inc. A silicone surfactant sold under the trade name TEGOSTAB® B 8465 by Evonik Industries—Degussa was used for this example.

The polyol pre-mix was prepared according to the following procedure: 100 parts by weight of a polyol blend, 1.0 parts by weight of dimethylcyclohexylamine, 2.2 parts by weight of water and 11.8 parts by weight of E1233zd blowing agent were mixed together to produce a polyol pre-mix blend. The polyol pre-mix was aged at ambient temperature for 15 and 190 days. Post-ageing, 0.3 parts by weight of pentamethyldiethylenetriamine and 2.0 parts by weight of silicone surfactant were added into the pre-mix formulation. Hand-mix foams using the pre-mix formulation were then prepared according to the following procedure: 100 g of the complete polyol pre-mix blend were mixed in a cup with 132 g of methylene diphenyl diisocyanate (MDI), and then poured into a cardboard cylinder. The rise profiles of the resulting foams were recorded using an ultrasonic Rate of Rise apparatus from Format Messtechnik GmbH. As known in the art, the start time is generally accepted to be the start of the reaction between the B-side (polyol+additives) and A-side (isocyanate) components after mixing. The foam rise continues until maximum expansion has been reached, and the time elapsed is called the "rise time." The effect of the ageing on the rise profiles is shown in Table 1a below:

TABLE 1a

Results for different time of ageing.

| Time of ageing (days) | Rise Time |
| --- | --- |
| 0 | 46.6 |
| 15 | 48.7 |
| 190 | 51.8 |

As can be seen in Table 1a, a loss of reactivity was observed as a result of increased ageing. Increased ageing of the dimethylcyclohexylamine catalyst reduced the reactivity of the catalyst and the B-side polyol pre-mix blend component with the isocyanate. This loss of reactivity is seen in the increased amount of rise time to reach maximum expansion. Accordingly, when dimethylcyclohexylamine catalyst is used as the amine catalyst, the resulting B-side polyol pre-mix blend was found to be have poor shelf-life stability.

Example 2a Comparative Example with Normalized Reactivity

To compare the effect of catalyst on stability, reaction rate or reactivity was normalized by adjusting catalyst level, and the polyol composition to maintain a constant amount of hydroxyl group.

Table 2a summarizes a comparative formulation "X" and a formulation in accordance with the present invention "Y", in which N,N,N'-trimethylaminoethyl-ethanolamine sold under the trade name JEFFCAT® Z-110 that is available from Huntsman; dimethylcyclohexylamine sold under the trade name POLYCAT® 8 and pentamethyldiethylenetriamine sold under the trade name POLYCAT® 5 were employed as the amine catalysts, both of which are available from Air Products and Chemicals, Inc.

In this example, the A-side component, a polymeric methylene diphenyl diisocyanate (MDI), and the B-side components a blend of the polyol, surfactant, catalysts, blowing agent, and additives, were mixed with a hand mixer and dispensed into a container to form a free rise foam. The B-side component was pre-blended according to the formulations shown in Table 2a. The formulations tested (which had an ISO Index of 115) contained a polymeric methylene diphenyl diisocyanate (MDI) sold by Huntsman under the trade name Rubinate M as the A-side component. The B-side component included an aqueous blend of polyols, such as those sold by Dow Chemical under the trade name Voranol 490, those sold by Huntsman under the trade name Jeffol R-425-X, and those sold by Stepan Company under the trade name Stepanpol PS-2352; a silicone surfactant sold under the trade name TEGOSTAB® B 8465 by Evonik Industries—Degussa; dimethylcyclohexylamine sold under the trade name POLYCAT® 8 and pentamethyldiethylenetriamine sold under the trade name POLYCAT® 5, both of which are available from Air Products and Chemicals, Inc.; and a hydrochlorofluoroolefin (HCFO) HCFO-1233zd "E" halogenated olefinic blowing agent. The total blowing level was 28.0 ml/g. Formulation Y, in accordance with the present invention also included an amine catalyst, specifically N,N,N'-trimethylaminoethyl-ethanolamine sold under the trade name JEFFCAT® Z-110 that is available from Huntsman.

TABLE 2a

| COMPONENT | wt % of Total | |
|---|---|---|
| | X | Y |
| Voranol 490 | 13.28 | 13.33 |
| Jeffol R-425-X | 15.10 | 15.14 |
| Stepan 2352 | 6.99 | 6.63 |
| Polycat 5 | 0.48 | 0 |
| Polycat 8 | 0.12 | 0.12 |
| Z-110 | 0 | 0.97 |
| Tegostab B8465 | 1.51 | 1.51 |
| Water | 0.55 | 0.56 |
| HCFO1233zd | 12.28 | 12.32 |
| Rubinate M | 49.7 | 49.5 |
| A-side/B-side | 0.99 | 0.98 |

The initial reactivity was measured and as summarized as in Table 3a

TABLE 3a

| Measured Properties | X | Y |
|---|---|---|
| Cream time, sec | 5 | 5 |
| Gel time, sec | 31 | 30 |
| Tack free time, sec | 50 | 51 |

As shown in Table 3a the reactivities of both formulas are very comparable due to the normalization. A second test was run where the X and Y formulas were aged for 15 days at 50° C., and foam was made according to procedures that were very similar to the above. Formula X was found to have detrimental effects on foam quality, indicating that both the catalysts and the surfactant lost almost all of their functional properties. Formula Y, on the other side, produced a foam with normal quality. Therefore with similar reactivity Formula Y was stable for foam quality, Formula X was not stable for foam quality. The Z110 amine catalyst had an unexpected impact on the stability of b-side blends.

Example 2

Example 2 shows a comparative formulation to those of the present invention, in which dimethylcyclohexylamine sold under the trade name POLYCAT® 8 and pentamethyldiethylenetriamine sold under the trade name POLYCAT® 5 were employed as the amine catalysts, both of which are available from Air Products and Chemicals, Inc.

In this example, the A-side component, which is a polymeric methylene diphenyl diisocyanate (MDI), and the B-side component, which is a blend of the polyol, surfactant, catalysts, blowing agent, and additives, were mixed with a hand mixer and dispensed into a container to form a free rise foam. The B-side component was pre-blended according to the formulation shown in Table 2 below. The formulation tested (which had an ISO Index of 115) contained a polymeric methylene diphenyl diisocyanate (MDI) sold by Huntsman under the trade name Rubinate M as the A-side component. The B-side component included an aqueous blend of polyols, such as those sold by Dow Chemical under the trade name Voranol 490, those sold by Huntsman under the trade name Jeffol R-425-X, and those sold by Stepan Company under the trade name Stepanpol PS-2352; a silicone surfactant sold under the trade name TEGOSTAB® B 8465 by Evonik Industries—Degussa; amine catalysts, specifically dimethylcyclohexylamine sold under the trade name POLYCAT® 8 and pentamethyldiethylenetriamine sold under the trade name POLYCAT® 5, both of which are available from Air Products and Chemicals, Inc.; and a hydrochlorofluoroolefin (HCFO) HCFO-1233zd "E" halogenated olefinic blowing agent. The B-side component also included Antiblaze 80, a flame retardant from Rhodia. The total blowing level was 23.0 ml/g.

TABLE 2

Comparative Formulation of Example 2.

| COMPONENT | wt % of Total |
|---|---|
| Voranol 490 | 17.39 |
| Jeffol R-425-X | 10.43 |
| Stepan 2352 | 6.96 |
| Polycat 5 | 0.16 |
| Polycat 8 | 0.50 |
| Tegostab B8465 | 0.71 |
| Antiblaze 80 | 2.36 |
| Water | 0.74 |
| HCFO1233zd | 8.04 |
| Rubinate M | 52.71 |
| A-side/B-side | 1.11 |

Three samples were prepared according to the above formulation and aged for different periods of time and different conditions: an unaged sample, a sample aged for 15 days at ambient temperature, and a sample aged for 15 days at 50° C. Properties such as cream, gel, and tack free times, free rise density (FDR), and foam quality were measured, which are summarized in Table 3 below:

TABLE 3

Measured properties for aged formulation of Example 2.

| Measured Properties | Unaged Sample | Aged 15 days @ Ambient Temp | Aged 15 days @ 50° C. |
|---|---|---|---|
| Cream time, sec | 8 | 10 | 16 |
| Gel time, sec | 37 | 41 | 53 |
| Tack free time, sec | 75 | 92 | —* |
| Free Rise Density (pcf) | 1.78 | 1.83 | —* |
| Foam quality | Good | Good | Poor |
| Foam quality rating | 1 | 1 | 5 |
| % Change from Unaged Sample: | | | |
| Cream time | — | 25 | 100 |
| Gel time | — | 11 | 43 |
| Tack free time | — | 23 | — |
| Free Rise Density | — | 3 | — |

*Could not be measured due to poor foam quality.

As shown in Table 3 above, ageing the polyol blend formulation of Example 2 had a detrimental effect on foam quality. The sample aged for 15 days at 50° C. was found to have increased detrimental effects on foam quality, indicating that both the catalysts and the surfactant lost almost all of their functional properties. Accordingly, the comparative formulation of Example 2 was found to have poor shelf-life stability and performance characteristics.

Example 3

Example 3 shows an exemplary formulation of the present invention, in which bis-(2-dimethylaminoethyl)ether was employed as the amine catalyst.

Using the same procedure as in Example 2 above, a formulation was created which substituted an equal mole of pentamethyldiethylenetriamine (PMDETA) in the formulation of Example 2 with bis-(2-dimethylaminoethyl)ether as the amine catalyst. The resulting properties are summarized in Table 4 below:

TABLE 4

Measured properties for aged formulation of Example 3.

| Measured Properties | Unaged Sample | Aged 15 days @ Ambient Temp | Aged 15 days @ 50° C. |
|---|---|---|---|
| Cream time, sec | 8 | 9 | 15 |
| Gel time, sec | 36 | 38 | 57 |
| Tack free time, sec | 70 | 79 | —* |
| Free Rise Density (pcf) | 1.77 | 1.83 | —* |
| Foam quality | Good | Good | Coarse |
| Foam quality rating | 1 | 1 | 4 |
| % Change from Unaged Sample: | | | |
| Cream time | | 13 | 88 |
| Gel time | | 6 | 58 |
| Tack free time | | 13 | — |
| Free Rise Density | | 3 | — |

*could not be measured due to poor foam quality.

As shown in Table 4 above, ageing the polyol blend formulation of Example 3 also had a detrimental effect on foam quality. The sample aged for 15 days at 50° C. was found to have increased detrimental effects on foam quality, indicating that both the catalysts and the surfactant lost almost all of their functional properties. 20 Accordingly, the formulation of Example 3 was found to have poor shelf-life stability and performance characteristics. Notably, the bis-(2-dimethylaminoethyl)ether amine catalyst is a sterically-hindered amine catalyst which has been proposed in the art as a solution to the reactivity and stability problems.

Example 4

Example 4 shows an exemplary formulation of the present invention, in which N,N,N'-trimethyl-N'-hydroxyethyl-bisaminoethylether was employed as the amine catalyst.

Using the same procedure as in Example 2 above, a formulation was created which substituted an equal mole of pentamethyldiethylenetriamine (PMDETA) in the formulation of Example 2 with N,N,N'-trimethyl-N'-hydroxyethyl-bisaminoethylether as the amine catalyst. The resulting properties are summarized in Table 5 below:

TABLE 5

Measured properties of the aged formulation of Example 4.

| Measured Properties | Unaged Sample | Aged 15 days @ Ambient Temp | Aged 15 days @ 50° C. |
|---|---|---|---|
| Cream time, sec | 10 | 11 | 15 |
| Gel time, sec | 42 | 44 | 56 |
| Tack free time, sec | 86 | 94 | 125 |
| Free Rise Density (pcf) | 1.80 | 1.84 | 1.85 |
| Foam quality | Good | Good | Glassy |
| Foam quality rating | 1 | 1 | 3 |
| % Change from Unaged Sample: | | | |
| Cream time | | 10 | 50 |
| Gel time | | 5 | 33 |
| Tack free time | | 9 | 45 |
| Free Rise Density | | 2 | 3 |

As shown in Table 5 above, ageing the polyol blend formulation of Example 4 showed a much less detrimental effect on foam quality. The sample aged for 15 days at 50° C. was found to have lower detrimental effects on foam quality than the samples of Examples 2 and 3 above, indicating that both the catalysts and the surfactant lost much less of their functional properties. Accordingly, the formulation of Example 4 was found to have suitable and improved shelf-life stability and performance characteristics, compared to the formulations of Examples 2 and 3 above.

Example 5

Example 5 shows an exemplary formulation of the present invention, in which 2-(2-dimethylaminoethoxy)ethanol was employed as the amine catalyst.

Using the same procedure as in Example 2 above, a formulation was created which substituted an equal mole of pentamethyldiethylenetriamine (PMDETA) in the formulation of Example 2 with 2-(2-dimethylaminoethoxy)ethanol as the amine catalyst. The resulting properties are summarized in Table 6 below:

TABLE 6

Measured properties of the aged formulation of Example 5.

| Measured Properties | Unaged Sample | Aged 15 days @ Ambient Temp | Aged 15 days @ 50° C. |
|---|---|---|---|
| Cream time, sec | 13 | 13 | 15 |
| Gel time, sec | 47 | 47 | 58 |
| Tack free time, sec | 107 | 108 | 132 |
| Free Rise Density (pcf) | 1.82 | 1.83 | 1.86 |
| Foam quality | Good | Good | Slightly Glassy |
| Foam quality rating | 1 | 1 | 2 |
| % Change from Unaged Sample: | | | |
| Cream time | | 0 | 15 |
| Gel time | | 0 | 23 |
| Tack free time | | 1 | 23 |
| Free Rise Density | | 1 | 2 |

As shown in Table 6 above, ageing the polyol blend formulation of Example 4 also showed a much less detrimental effect on foam quality. The sample aged for 15 days at 50° C. was found to have lower detrimental effects on foam quality than the samples of Examples 2 and 3 above, indicating that both the catalysts and the surfactant lost much less of their functional properties. Accordingly, the formulation of Example 5 was found to have suitable and improved shelf-life stability and performance characteristics, compared to the formulations of Examples 2 and 3 above.

Example 6

Example 6 shows an exemplary formulation of the present invention, in which N,N,N'-trimethylaminoethyl-ethanolamine was employed as the amine catalyst.

Using the same procedure as in Example 2 above, a formulation was created which substituted an equal mole of pentamethyldiethylenetriamine (PMDETA) in the formulation of Example 2 with N,N,N'-trimethylaminoethyl-ethanolamine as the amine catalyst. The resulting properties are summarized in Table 7 below:

TABLE 7

Measured properties of aged formulation of Example 6.

| Measured Properties | Unaged Sample | Aged 15 days @ Ambient Temp | Aged 15 days @ 50° C. |
|---|---|---|---|
| Cream time, sec | 12 | 12 | 15 |
| Gel time, sec | 46 | 47 | 57 |
| Tack free time, sec | 103 | 100 | 125 |
| Free Rise Density (pcf) | 1.74 | 1.79 | 1.80 |
| Foam quality | Good | Good | Slightly Glassy |
| Foam quality rating | 1 | 1 | 2 |
| % Change from Unaged Sample: | | | |
| Cream time | — | 0 | 25 |
| Gel time | — | 2 | 24 |
| Tack free time | — | -3 | 21 |
| Free Rise Density | — | 3 | 3 |

As shown in Table 7 above, ageing the polyol blend formulation of Example 6 showed a much less detrimental effect on foam quality. The sample aged for 15 days at 50° C. was found to have lower detrimental effects on foam quality than the samples of Examples 2 and 3 above, indicating that both the catalysts and the surfactant lost much less of their functional properties. Accordingly, the formulation of Example 6 was found to have suitable and improved shelf-life stability and performance characteristics, compared to the formulations of Examples 2 and 3 above.

Example 7

Example 7 shows the improved stability imparted by the use of a metallic salts, such as an alkali earth salt, which have good hydrofluoric acid (HF) scavenger activity. Magnesium formate is employed in this example as a HF scavenger, but other metallic salts, such as, for example, alkali earth carboxylates, alkali carboxylates, and carboxylates of zinc (Zn), cobalt (Co), tin (Sn), cerium (Ce), lanthanum (La), aluminum (Al), vanadium (V), manganese (Mn), copper (Cu), nickel (Ni), iron (Fe), titanium (Ti), zirconium (Zr), chromium (Cr), scandium (Sc), calcium (Ca), magnesium (Mg), strontium (Sr), and barium (Ba) which have good hydrofluoric acid (HF) scavenger activity can be employed according to the present invention to improve the stability of the polyol blend, and add to the stabilization effect of the oxygen-containing amine catalysts.

An aqueous formulation was prepared b y mixing together: 2 wt % pentamethyldiethylenetriamine (PMDETA), 4 wt % of a silicon surfactant (TEGOSTAB® B 8465), 2 wt % magnesium formate, and 92 wt % of a hydrochlorofluoroolefin (HCFO) HCFO-1233zd "E" halogenated olefinic blowing agent. For comparison, a solution without magnesium formate was prepared by mixing together: 2 wt % pentamethyldiethylenetriamine (PMDETA), 4 wt % of a silicon surfactant (TEGOSTAB® B 8465), and 94 wt % of a hydrochlorofluoroolefin (HCFO) HCFO-1233zd "E" halogenated olefinic blowing agent. The two mixture were then aged at 50° C. for 15 days in an oven. Each sample was mixed with a solution of deuterated chloroform (CDCl$_3$) solvent. The blends were then analyzed for NMR spectra at 25° C., acquired on a Bruker DRX 500 (11.7 T) spectrometer equipped with a 5 mm TBI probe. The small amount of products related to the interaction between the HCFO-1233zd "E" and the amine and silicon surfactant can be normalized to the HCFO-1233zd "E" and therefore quantified. The results of this comparison are summarized in Table 8 below.

TABLE 8

Comparison of formulations with and without the use of an metallic acid HF Scavenger.

| | Product related to the amine (%) | Product related to the surfactant (%) |
|---|---|---|
| Without Magnesium formate | 100 | 100 |
| With Magnesium formate | 3 | 8 |

As Table 8 shows, magnesium formate can suppress the formation of products by the detrimental interaction between hydrochlorofluoroolefin (HCFO) HCFO-1233zd "E" halogenated olefinic blowing agent and the amine and the surfactant.

Oxygen-containing amines, such as 2-(2-dimethylaminoethoxy)ethanol tested in Example 5 and N,N,N'-trimethylaminoethyl-ethanolamine tested in Example 6, were found to have much less reactivity with the halogenated olefins, such as HCFO-1233zd, than the traditional catalysts of Example 2 and the sterically hindered catalysts of Example 3. The oxygen-containing amines of the present invention also have better catalytic activity than the sterically hindered catalyst of Example 3. This can be confirmed by comparison of the hydrogen, fluorine, and silicon nuclear magnetic resonance (NMR) spectra of the comparative and exemplary blends and by gas chromatography-mass spectrometry (GC-MS), relative to the measurements for the comparative blends, which contained sterically-hindered catalysts, in Example 1.

Additionally, Example 8 shows that metallic salts, such as an alkali earth salt, have good hydrofluoric acid (HF) scavenger activity and improve the stability of the polyol blend. Example 8 employed magnesium formate as a HF scavenger. Metallic salts, such as, for example, alkali earth carboxylates, alkali carboxylates, and carboxylates of zinc (Zn), cobalt (Co), tin (Sn), cerium (Ce), lanthanum (La), aluminum (Al), vanadium (V), manganese (Mn), copper (Cu), nickel (Ni), iron (Fe), titanium (Ti), zirconium (Zr), chromium (Cr), scandium (Sc), calcium (Ca), magnesium (Mg), strontium (Sr), and barium (Ba) have good hydrofluoric acid (HF) scavenger activity, improve the stability of the polyol blend, and add to the stabilization effect of the oxygen-containing amine catalysts. For example, metallic salts having one or more functional carboxyl groups may be employed as a HF scavenger. Such metallic salts may include, for example, magnesium formate, magnesium benzoate, magnesium octoate, calcium formate, calcium octoate, zinc octoate, cobalt octoate, stannous octoate, and dibutyltindilaurate (DBTDL).

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A stable polyol pre-mix composition comprising the hydrochlorofluoroolefin blowing agent HCFO-1233zd, a polyol, a surfactant, a catalyst composition comprising an oxygen-containing amine catalyst selected from the group consisting of N,N,N'-trimethyl-N'-hydroxyethyl-bisaminoethylether, N,N,N'-trimethylaminoethyl-ethanolamine, and 2-(2-dimethylaminoethoxy)ethanol, and magnesium formate present as a hydrofluoric acid-scavenging metallic salt.

2. The stable polyol pre-mix composition of claim 1, further including a solvent.

3. The stable polyol pre-mix composition of claim 1, wherein the blowing agent further comprises one or more hydrocarbons, alcohols, aldehydes, ketones, ethers/diethers, or $CO_2$ generating materials, or combinations thereof.

4. The stable polyol pre-mix composition of claim 1, wherein the surfactant is a silicone or non-silicone surfactant.

5. The stable polyol pre-mix composition of claim 1, wherein the surfactant is a polysiloxane polyoxyalkylene block co-polymer silicone surfactant.

6. A stabilized thermosetting foam blend which comprises:
(a) a polyisocyanate and, optionally, one or more isocyanate compatible raw materials; and
(b) a polyol pre-mix composition which comprises the hydrochlorofluoroolefin blowing agent HCFO-1233zd, a polyol, a surfactant, a catalyst composition comprising an oxygen-containing amine catalyst selected from the group consisting of N,N,N'-trimethyl-N'-hydroxyethyl-bisaminoethylether, N,N,N'-trimethylaminoethyl-ethanolamine, and 2-(2-dimethylaminoethoxy) ethanol, and magnesium formate present as a hydrofluoric acid-scavenging metallic salt.

7. The stabilized thermosetting foam blend of claim 6, further including a solvent.

8. The stabilized thermosetting foam blend of claim 6, wherein the blowing agent further comprises one or more hydrocarbons, alcohols, aldehydes, ketones, ethers/diethers, or $CO_2$ generating materials, or combinations thereof.

* * * * *